United States Patent
Kumar et al.

(10) Patent No.: US 9,953,668 B1
(45) Date of Patent: Apr. 24, 2018

(54) ACTIVE FIBER COMPOSITE DATA STORAGE DEVICE SUSPENSION

(71) Applicant: Seagate Technology LLC, Cupertino, CA (US)

(72) Inventors: Vijay Kumar, Edina, MN (US); Razman Zambri, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/281,264

(22) Filed: Sep. 30, 2016

(51) Int. Cl.
- *G11B 5/48* (2006.01)
- *G11B 5/60* (2006.01)
- *G11B 5/55* (2006.01)

(52) U.S. Cl.
CPC .......... *G11B 5/4853* (2013.01); *G11B 5/483* (2015.09); *G11B 5/4833* (2013.01); *G11B 5/5552* (2013.01); *G11B 5/6058* (2013.01)

(58) Field of Classification Search
CPC ...... G11B 5/483; G11B 5/5552; G11B 5/6058
USPC ................. 360/294.4, 294.7, 244.9
See application file for complete search history.

(56) References Cited

U.S. PATENT DOCUMENTS

| | | | | |
|---|---|---|---|---|
| 6,282,066 B1 * | 8/2001 | Bonin | ................... | G11B 21/08 360/294.1 |
| 7,248,444 B1 * | 7/2007 | Lauer | ................... | G11B 5/102 360/244.4 |
| 7,541,715 B2 | 6/2009 | Chiang et al. | | |
| 7,692,365 B2 | 4/2010 | Churchill et al. | | |
| 7,880,370 B2 | 2/2011 | Churchill et al. | | |
| 8,756,776 B1 * | 6/2014 | Chen | ................... | H01L 41/0986 29/25.35 |
| 9,076,469 B1 * | 7/2015 | Kuwajima | ............... | G11B 5/48 |
| 9,381,653 B2 | 7/2016 | Kim et al. | | |
| 9,431,041 B1 * | 8/2016 | Schreiber | | |
| 9,818,928 B2 * | 11/2017 | Park | ................... | H01L 41/0825 |
| 2001/0032508 A1 * | 10/2001 | Lemkin | ................ | G01P 15/125 73/514.32 |
| 2005/0012434 A1 | 1/2005 | Pizzochero et al. | | |
| 2006/0102455 A1 * | 5/2006 | Chiang | ................... | F03G 7/005 200/181 |
| 2008/0252174 A1 | 10/2008 | Mohammadi et al. | | |
| 2009/0056094 A1 * | 3/2009 | Shi | ....................... | H01L 41/1876 29/25.35 |
| 2009/0284871 A1 * | 11/2009 | Yao | ....................... | G11B 5/4853 360/294.4 |
| 2009/0316306 A1 * | 12/2009 | Yao | ....................... | G11B 5/4826 360/245.3 |
| 2010/0195252 A1 * | 8/2010 | Kashima | .............. | G11B 5/4833 360/294.4 |
| 2011/0043454 A1 * | 2/2011 | Modarres | .............. | B06B 1/0629 345/173 |
| 2013/0250007 A1 * | 9/2013 | Ishimori | ............. | H01L 41/0477 347/70 |
| 2015/0263262 A1 * | 9/2015 | Sunahara | ............ | H01L 41/0533 310/340 |

(Continued)

Primary Examiner — Jefferson Evans
(74) Attorney, Agent, or Firm — Hall Estill Attorneys at Law

(57) ABSTRACT

A data storage device may employ a suspension that positions a transducing head proximal a data storage medium. The suspension can consist of an active fiber composite that spans a portion of a loadbeam. The active fiber composite can be configured with at least one active fiber contacting a supporting layer.

19 Claims, 3 Drawing Sheets

(56) References Cited

U.S. PATENT DOCUMENTS

2016/0093792 A1* 3/2016 Xiong ................ H01L 41/0815
360/294.4

* cited by examiner

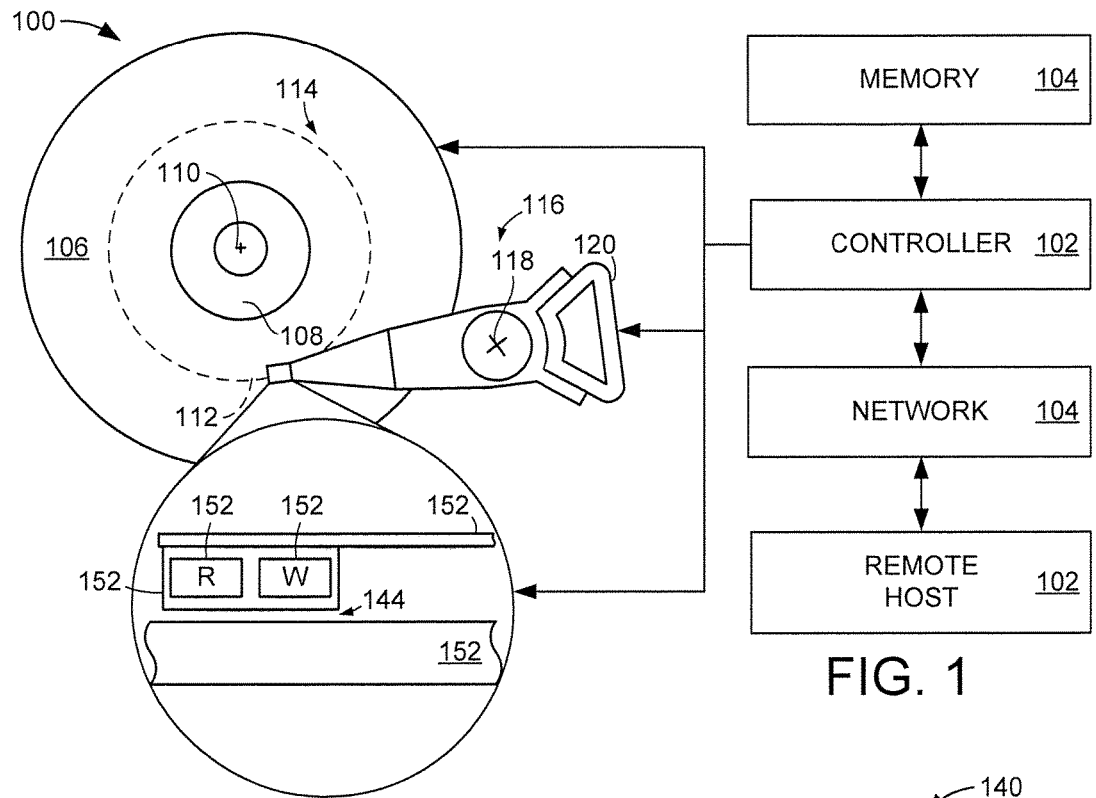
FIG. 1
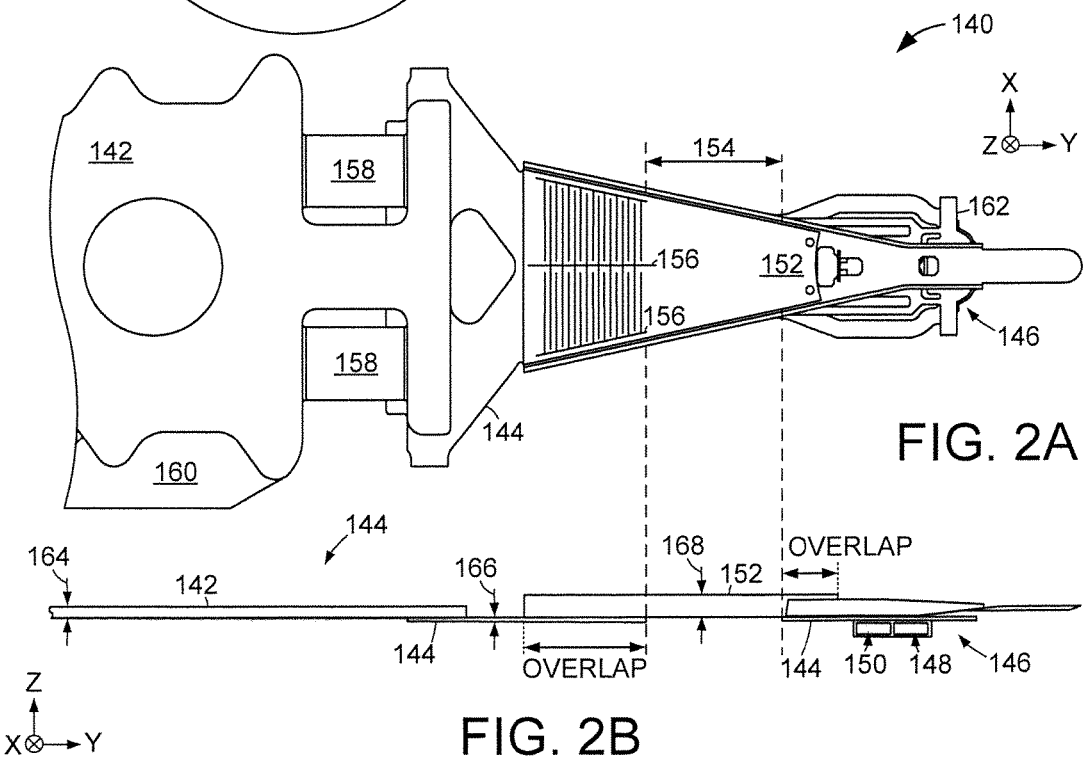
FIG. 2A
FIG. 2B

FIG. 3
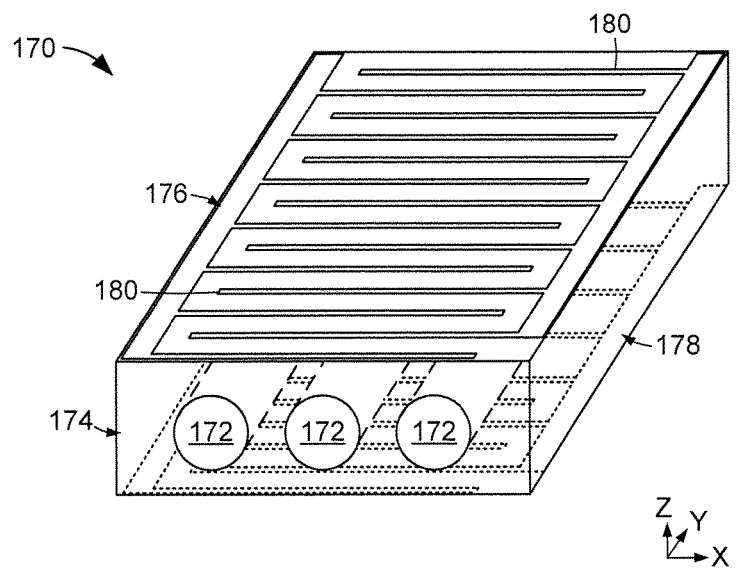
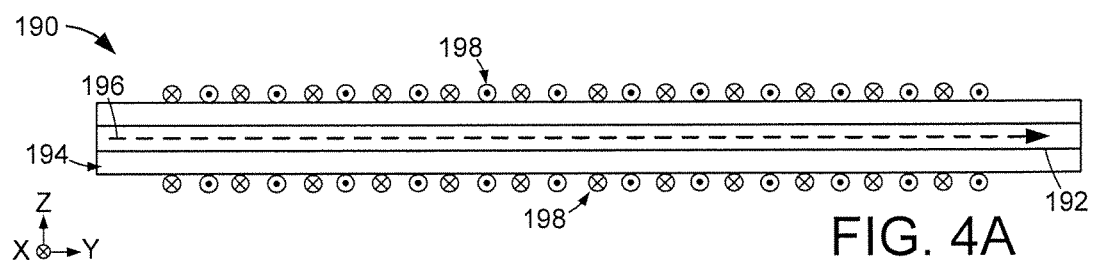
FIG. 4A
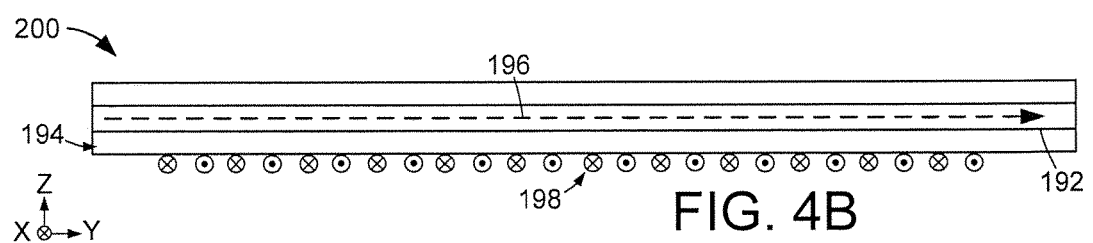
FIG. 4B
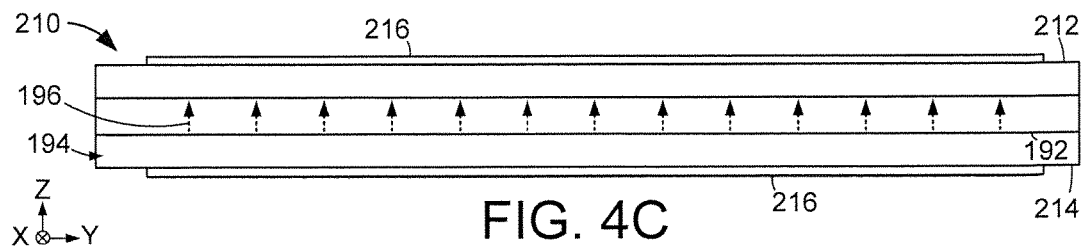
FIG. 4C

ACTIVE FIBER COMPOSITE DATA STORAGE DEVICE SUSPENSION

SUMMARY

A data storage device, in some embodiments, has a data storage device with a suspension that positions a transducing head proximal a data storage medium. The suspension consists of an active fiber composite that spans a portion of a loadbeam and is configured with at least one active fiber contacting a supporting layer.

BRIEF DESCRIPTION OF THE DRAWINGS

FIG. 1 is a block representation of an example data storage system arranged in accordance with various embodiments.

FIGS. 2A and 2B respectively show portions of an example head-gimbal assembly capable of being used in the data storage system of FIG. 1.

FIG. 3 depicts a line representation of a portion of an example active fiber composite that may be employed in the data storage system of FIG. 1.

FIGS. 4A-4C respectively are side view line representations of example active fiber composites constructed and operated in accordance with various embodiments.

DETAILED DESCRIPTION

Figure 5:
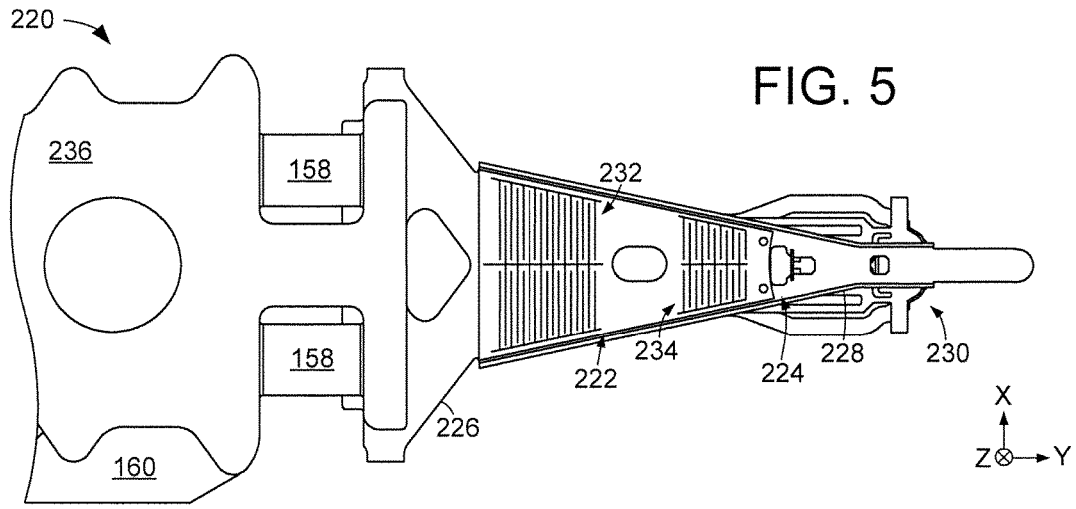
FIG. 5 conveys a top view line representation of a portion of an example head-gimbal assembly capable of being utilized in the data storage system of FIG. 1.

In data storage devices with rotating media, such as hard disk drives and hybrid drives that employ rotating and solid-state memories, a suspension enables data reading and writing operations. Various embodiments are generally directed to a data storage system that employs a suspension configured with an active fiber composite that improve the material properties of the suspension. The use of one or more active fiber composites provides cost benefits and additional data sensing capabilities that are unavailable with conventional data storage suspensions.

FIG. 1 is a block representation of an example data storage system 100 in which embodiments of the present disclosure can be employed. The data storage system 100 can employ one or more data storage devices that each have a controller 102, such as a microcontroller, microprocessor, or application specific integrated circuit (ASIC), and a local memory module 104. The controller 102 can be a fixed or programmable processor based control circuit that provides top level communication and control functions as the device interfaces with one or more remote host devices 106 via a wired and/or wireless network 108. Data from a local or remote host device is transferred for storage into the memory 104, which can take a variety of volatile and/or non-volatile configurations, such as hard disk drive (HDD), hybrid, and solid-state non-volatile memories Various embodiments arrange at least one magnetic rotatable data storage medium 110 into a HDD where the medium 110 is rotated at a predetermined speed by a spindle motor 112 at a constant high velocity about a central axis 114. A plurality of concentric data tracks 116, such as track 116, are defined on the various disk recording surfaces and accessed by a corresponding transducing head 118 that is positioned over a selected tack by a rotary micro-actuator assembly 120 that pivots about a central actuator axis 122 in response to a voice coil motor 124. In other HDD designs, the controller 102 and micro-actuator 120 can be dual-stage, or more generally multi-stage. For example, a primary stage can be a voice-coil motor actuated servo system that actuates the entire head-stack assembly in which the head-gimbal assembly resides while a second stage could be a micro-actuator system that has a wider and larger maximum frequency response. Such multi-stage micro-actuation systems afford increased servo bandwidth and improved tracking performance resulting in increased recording areal density.

Controlled application of current to the voice coil motor 124 induces controlled rotation of the micro-actuator 120 about axis 122 and radial movement of the head(s) 118 across the disk surfaces. A preamplifier/driver circuit (pre-amp) may operably be connected between the controller 102 and the transducing head 118 to enable data transfers between a host device and the disks 110. During a data write operation, a data writer 126 of the transducing head 118 forms of a sequence of magnetic flux transitions in a recording layer of the associated disc 110. During a subsequent read operation, a data reader 130 is aligned with a corresponding track 116 on which the data to be retrieved is resident.

As shown, the transducing head 118 can be supported by a loadbeam 132 portion of the micro-actuator 120, which acts to suspend and separate the data writer 128 and reader 130 above the data storage medium 110 by an air bearing 134. It is noted that the transducing head 118 and loadbeam 132 can be collectively referred to as a head-gimbal assembly and may comprise any number of components, such as a dimple, slider, and flex circuit, that provide sophisticated suspension and actuation with respect to the underlying data storage medium 110. FIGS. 2A and 2B respectively illustrate top and side view line representations of portions of an example head-gimbal assembly 140 that may be utilized in the data storage system 100 of FIG. 1.

In the top view of FIG. 2A, a baseplate 142 is attached to a loadbeam 144. It is contemplated that the loadbeam 144 continuously extends from the baseplate 142 to a slider region 146 where a data reader 148 and writer 150 are resident, as shown in FIG. 2B. In some embodiments, an active fiber composite 152 spans a gap 154 in the loadbeam 144, as represented between segmented lines, while other embodiments place the active fiber composite 152 atop the loadbeam 144. The active fiber composite 152 can consist of at least pair of interdigitized electrodes 156 that are physically separated, but can be selectively be activated, and sensed, to activate and monitor the physical configuration of at least a portion of the active fiber composite 152.

The active fiber composite 152 may be complemented by one or more microactuators 158 that may be any material and/or mechanism for moving the loadbeam 144. The size and position of the active fiber composite 152 can be customized so that a flex circuit 160 and gimbal 162 can be incorporated into the head-gimbal assembly 140 without adding weight or changing the center of gravity of the loadbeam 144, when compared to a continuous metal loadbeam alone.

FIG. 2B shows how the baseplate can have a thickness 164, such as 150 µm, while the loadbeam 144 has a smaller thickness 166, such as 30 µM, and the active fiber composite 152 has a greater thickness 168, such as 200-300 µm. When the active fiber composite 152 spans an aperture, gap, or void 154 in the loadbeam 144 with a zero thickness, there will areas of overlap between the composite 152 and loadbeam 144 to allow for adhesion, such as via laser welding, fastener(s), or an adhesive. To clarify, the active fiber composite 152 may provide the only physical connection between two, otherwise separate loadbeam portions, may span a lack of loadbeam material, or may continuously rest atop the loadbeam 144.

It is noted that the loadbeam 144, portions of the gimbal 160, and the baseplate 142 may individually be constructed as a single sheet of material, such as formed or stamped stainless steel. Such configuration can be imprecise, particularly in high data density HDD where data tracks are potentially more narrow and closer together. By replacing some, or all, of the loadbeam 144 with the active fiber composite 152, the actuation sensitivity and resolution of the head-gimbal assembly 140 can be optimized for high data density data storage environments.

FIG. 3 is a cross-sectional line representation of a portion of an active fiber composite 170 that can be used for portions of at least loadbeam, baseplate, and gimbal of a head-gimbal assembly in accordance with various embodiments. The active fiber composite 170 has at least one active fiber 172 that can be any electrically selectable material, such as perovskite that exhibits piezoelectric effects (PZT). A non-conductive material 174, such as epoxy, supports each active fiber 172. The supporting material 174 and active fiber(s) 172 can respectively be arranged with any cross-sectional shape and size, such as rectangular, square, circular, semicircular, and rhomboid, to allow at least one pair of electrodes to be positioned to selectively engage the active fiber(s) 172 to induce and/or sense a physical configuration of the active fiber composite 170.

In the non-limiting embodiment of FIG. 3, the supporting material 174 has a rectangular shape on which a first 176 and second 178 pair of electrodes are printed. Each electrode pair 176 and 178 consists of leads 180 having different magnetic polarities, which induces, and senses, movement of the supporting material 174. In contrast to a microactuator, such as element 156 of FIG. 2A, the active fiber composite 170 utilizes the active fiber(s) 172 to simultaneously sense the physical configuration of the supporting material 174 while the electrode pairs 176 and 178 are activated to induce physical deformation of the supporting material 174. As such, the active fiber composite can be used for very sensitive active damping and vibration suppression that is not possible with microactuators that lack the combination of electrodes and active fibers.

It is noted that the respective electrode pairs 176 and 178 are positioned on opposite surfaces of the supporting material 174. The position and patterning of the respective leads 180 can be optimized in combination with the configuration of the active fiber(s) 172 to utilize the $d_{33}$ piezoelectric coefficient of the active fiber(s) 172. The ability to customize the configuration of the electrode pairs 176 and 178 with respect to the active fiber(s) 172 can provide an improved microactuator with increased sensitivity and resolution compared to when a PZT material is imprinted with electrodes.

FIGS. 4A, 4B, and 4C respectively display cross-sectional line representations of different active fiber composites 190, 200, and 210 that can individually, and collectively, be employed in a head-gimbal assembly in accordance with assorted embodiments. The active fiber composite 190 of FIG. 4A shows how an active fiber 192 is oriented along a longitudinal axis of the support material 194 with a magnetic pole direction shown by arrow 196. Electrode leads 198 are organized as an electrode pair positioned on opposite surfaces with a portion of the leads 198 being carrying a positive polarity, as illustrated by an arrow coming out of the page along the X axis, and another portion of the leads 198 carrying a negative polarity, as illustrated by an arrow going into the page along the X axis.

With the leads 198 being placed on separate surfaces of the support material 194 and opposite sides of the active fiber 192, the active fiber composite 190 can be characterized as a double-sided composite. The respective electrode leads 198 may be shorted by using electrical patterns on the side of the support material 194, which can electrically isolate the leads 198 from other electrical traces of a gimbal assembly. In FIG. 4B, the active fiber composite 200 has electrode leads 198 patterned on a single side of the support material 194 with the active fiber 192 oriented and poled in the same manner as composite 190.

The active fiber composite 210 of FIG. 4C shows how the active fiber 192 is oriented with the longitudinal axis parallel to the Y axis, but is magnetically poled parallel to the Z axis, which is also the thickness direction of the support material 194. While interdigitized electrode leads 198 may be utilized in the active fiber composite 210, some embodiments pattern opposite top 212 and bottom 214 surfaces of the support material 194 as single electrode layers 216 that continuously extend to contact a majority of the surface area of the top 212 or bottom 214 surfaces. It is contemplated that the respective electrode layers can be selectively activated with either positive or negative polarity to engage with the active fiber 192.

A first electrode layer may be connected to the loadbeam of a head-gimbal assembly via a conductive adhesive that may be used for an interconnect while the opposite electrode layer is directly connected to an electrical ground. The opposite polarities of the respective electrode layers and/or leads 198 can provide rotary motion of the support material 194 about the X, Y, or Z axes depending on the orientation of the electrodes.

FIG. 5 depicts a top view line representation of an example head-gimbal assembly 220 portion of a data storage system configured in accordance with various embodiments so that an active fiber composite 222 replaces a portion of a loadbeam 224. The active fiber composite 222 provides the only physical interconnection between a mount 226 and gimbal 228 portions of the loadbeam 224. The mount 226 and gimbal 228 portions may be rigid, flexible, or semi-rigid to allow the active fiber composite 222 to concurrently induce a selected physical position of the gimbal 230 while sensing and sending the physical configuration of the composite 222 to a host, such as controller 102 of FIG. 1.

As shown, the active fiber composite 222 has first 232 and second 234 electrode regions that each have a pair of electrode leads polarized in opposite directions. The respective electrode regions 232 and 234 have different sizes and positions that can be complemented by one or more electrode layers, or electrode pairs, on the opposite bottom side of the active fiber composite 222.

By independently positioning and electrically connecting electrodes in combination with tuning the position and pole orientation of the active fiber(s), any desired motion can be induced and sensed by the active fiber composite 222. For example, if a reaction force in a downtrack direction (X axis) is desired, the baseplate 236 can be constructed, partially or wholly, of an active fiber composite material with a PZT material active fiber oriented such that it is parallel to the longitudinal direction of the suspension (Y axis) to induce a $d_{31}$ mode response from the active fiber(s) that can be used for sensing force and position of the active fiber composite as well as the position of the gimbal 230. Similarly, if transverse force is to be induced and/or sensed, the active fiber of an active fiber composite is oriented parallel to an offtrack direction (Y axis).

Since the direction of the active fiber(s) of an active fiber composite are set during fabrication, active fibers can be proactively oriented in different, orthogonal directions in the support material to allow for movement inducement and sensing in downtrack and offtrack directions. In some embodiments, the active fiber(s) of an active fiber composite is used for sensing loadbeam 224 and gimbal 230 motion, which can be utilized for active damping by tuning the input signal to the active fiber(s) and/or the composite electrodes.

It is noted that the multiple electrode regions 232 and 234 can be characterized as a multizone configuration that enables multi-mode control. That is, by using independent electrode patterning for the respective regions 232 and 234, the response and sensing of from the different zones of the support material can be captured independently. With a multizone electrode configuration, the various electrodes can be connected independently, such as with extra pin-outs, or can be connected in series so that the response from each electrode can be isolated by a local and/or remote controller during post-processing of active fiber composite signals.

Figure 6:
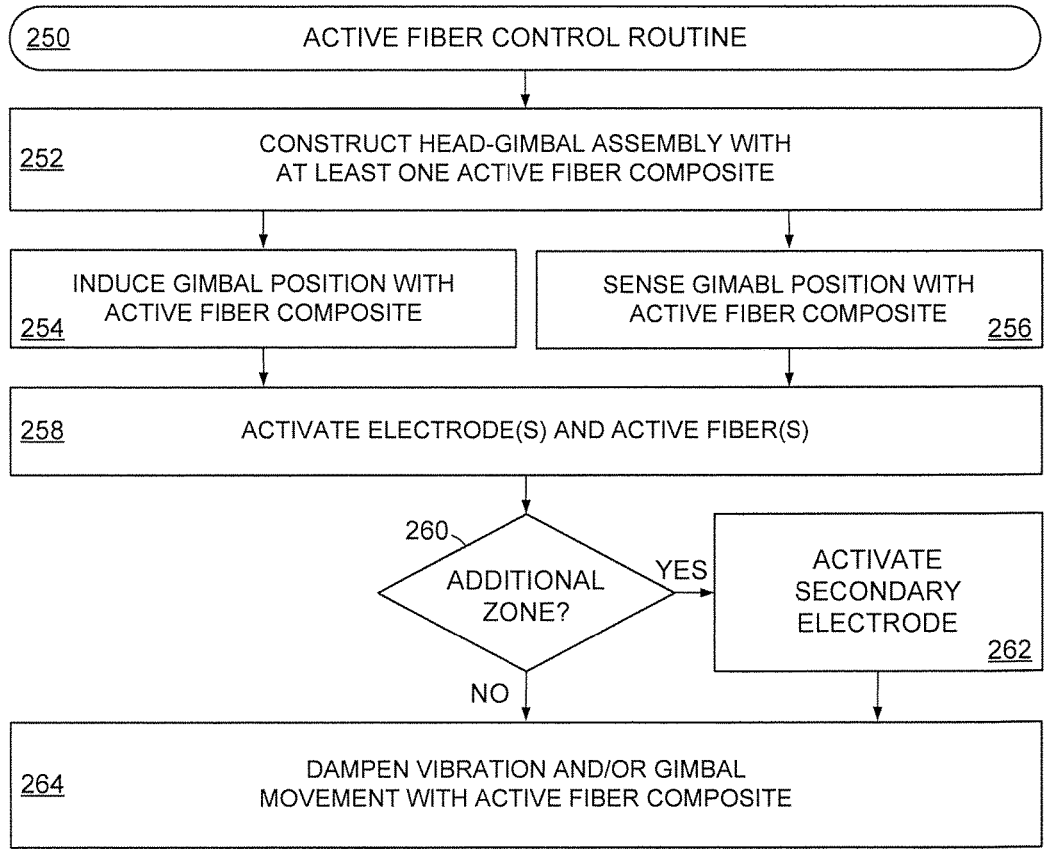
FIG. 6 provides a flowchart for an example active fiber control routine performed in accordance with various embodiments.

FIG. 6 provides an example active fiber control routine 250 that may be carried out by a head-gimbal assembly configured in accordance with various embodiments described in FIGS. 1-5. The routine 250 begins by constructing a head-gimbal assembly in step 252 with at least one active fiber composite having at least two electrodes. Each active fiber composite will have one or more active fiber(s) surrounded by a non-conductive support material.

Step 252 tunes the orientation of the active fiber(s), number of electrodes, position of the electrodes, and position of the active fiber composite to induce customized gimbal movement in step 254 and suspension position sensing in step 256 by activating at least one electrode and active fiber in step 258. The concurrent execution of steps 254 and 256 is not required and the respective steps can be performed independently, if desired. The activation of a single electrode or electrode pair may be complemented by actuation or sensing from one or more additional electrodes.

Decision 260 evaluates and determines if a supplemental electrode, or electrode pair, is to be activated. If multi-mode activation is chosen from decision 260, step 262 proceeds to activate at least one secondary electrode, which may be physically separate from the electrode(s) activated in step 258. At the conclusion of step 262, or in the event no additional electrodes are to be activated, step 264 then utilizes the concurrent active fiber composite induced movement and position sensing to actively control vibration and dampen gimbal movement, which can optimize the performance of the head-gimbal assembly. The various steps and decision of routine 250 are not required or limiting and additional aspects can be added just as existing aspects can be changed or removed.

Through the various embodiments of the present disclosure, an active fiber composite can supplement or replace portions of a head-gimbal assembly to allow simultaneous inducement of movement and sensing of position. The replacement of portions of a baseplate, loadbeam, or both with one or more active fiber composites improves the material properties and behavior of a data storage device suspension while maintaining similar mass and stiffness as suspensions constructed with rigid materials, like stainless steel. The ability to supplement an active fiber composite with a microactuator and/or a secondary active fiber composite provides multi-mode suspension actuation that can increase the sensitivity and precision in positioning a data transducer over a data track and data bit.

It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising a data storage device having a suspension positioning a transducing head proximal a data storage medium, the suspension comprising an active fiber composite spanning a portion of a loadbeam, the active fiber composite comprising a first active fiber contacting, and separated from a second active fiber of the active fiber composite by, a non-conductive supporting layer, the first active fiber and second active fiber each separated from an electrode of the active fiber composite by the supporting layer.

2. The apparatus of claim 1, wherein the non-conductive supporting layer surrounds the first active fiber.

3. The apparatus of claim 1, wherein the active fiber composite continuously contacts a top surface of the loadbeam, the top surface opposite a bottom surface that contacts a gimbal, the gimbal supporting the transducing head.

4. The apparatus of claim 1, wherein the first active fiber comprises a piezoelectric transducer material.

5. The apparatus of claim 1, wherein the first active fiber has a longitudinal axis aligned parallel with a longitudinal axis of the active fiber composite.

6. The apparatus of claim 1, wherein the active fiber composite has a greater thickness than the loadbeam.

7. The apparatus of claim 1, wherein the loadbeam is connected to a baseplate via at least one microactuator.

8. An apparatus comprising a data storage device having a suspension positioning a transducing head proximal a data storage medium, the suspension comprising an active fiber composite spanning a portion of a loadbeam, the active fiber composite comprising a first and second active fibers suspended between a first electrode and a second electrode, the first active fiber separated from the second active fiber by contacting a supporting layer, the first and second active fibers each separated from the first and second electrodes by the supporting layer.

9. The apparatus of claim 8, wherein the first and second electrodes are respectively positioned on separate surfaces of the active fiber composite.

10. The apparatus of claim 8, wherein the first electrode is separated from a third electrode on a common surface of the active fiber composite.

11. The apparatus of claim 8, wherein the first and second electrodes are electrically independent and connected to different ports of a controller.

12. The apparatus of claim 8, wherein the first and second active fibers are each electrically conductive and selectable.

13. The apparatus of claim 8, wherein the first electrode comprises a positive lead and a negative lead.

14. The apparatus of claim 13, wherein the positive lead of the first electrode comprises at least one positive finger separated from at least one negative finger on a common surface of the active fiber composite.

15. The apparatus of claim 8, wherein the active fiber composite spans an aperture in the loadbeam.

16. A method comprising:
   positioning a transducing head proximal a data storage medium with a suspension of a data storage device, the suspension comprising an active fiber composite spanning a portion of a loadbeam, the active fiber composite comprising a first active fiber and a second active fiber, the first active fiber physically separated from the second active fiber, each active fiber contacting a non-conductive supporting layer, each active fiber separated from an electrode of the active fiber composite by the supporting layer;
   activating at least one electrode of the active fiber composite to manipulate a position of the transducing head relative to the data storage medium; and
   sensing a position of the suspension with the active fiber composite while the at least one electrode is activated.

17. The method of claim 16, wherein the transducing head is manipulated to decrease an air bearing size between the transducing head and the data storage medium.

18. The method of claim 16, wherein the transducing head is manipulated to rotate the loadbeam and move the transducing head from a first track of the data storage medium to a different second track of the data storage medium.

19. The method of claim 16, wherein motion of the transducing head is sensed by a controller via signals received from the active fiber composite.

* * * * *